US008180481B2

(12) United States Patent
Stergiou et al.

(10) Patent No.: US 8,180,481 B2
(45) Date of Patent: May 15, 2012

(54) AUTOLOOP SYSTEM AND METHOD OF OPERATION

(75) Inventors: Paul V. Stergiou, Bayside, NY (US); William J. Harris, Matawan, NJ (US)

(73) Assignee: Consolidated Edison Company of New York, Inc., New York, NY (US)

( * ) Notice: Subject to any disclaimer, the term of this patent is extended or adjusted under 35 U.S.C. 154(b) by 934 days.

(21) Appl. No.: 12/186,593

(22) Filed: Aug. 6, 2008

(65) Prior Publication Data

US 2010/0036538 A1 Feb. 11, 2010

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G05B 11/01* (2006.01)

(52) U.S. Cl. ............ 700/192; 700/22; 700/86; 700/191; 700/295; 361/61; 361/62; 361/66; 361/68; 361/81; 307/66; 307/70; 307/80; 307/81

(58) Field of Classification Search .................... 700/22, 700/286, 291–298; 361/61–68, 81–84; 340/870.16; 307/66, 70, 80–81
See application file for complete search history.

(56) References Cited

U.S. PATENT DOCUMENTS

| | | | | |
|---|---|---|---|---|
| 5,303,112 A | | 4/1994 | Zulaski et al. | |
| 5,784,237 A | * | 7/1998 | Velez | 361/62 |
| 6,005,759 A | * | 12/1999 | Hart et al. | 361/66 |
| 6,008,971 A | * | 12/1999 | Duba et al. | 361/64 |
| 6,075,368 A | * | 6/2000 | Schumacher et al. | 324/539 |
| 6,275,366 B1 | * | 8/2001 | Gelbien et al. | 361/62 |
| 6,356,426 B1 | * | 3/2002 | Dougherty | 361/102 |
| 6,385,023 B1 | * | 5/2002 | Pednekar et al. | 361/71 |
| 6,697,240 B2 | * | 2/2004 | Nelson et al. | 361/64 |
| 6,735,534 B2 | * | 5/2004 | McClure et al. | 702/58 |
| 6,778,369 B2 | * | 8/2004 | Perichon | 361/64 |
| 6,816,757 B1 | * | 11/2004 | De La Ree et al. | 700/286 |
| 6,867,958 B2 | * | 3/2005 | McClure et al. | 361/72 |
| 7,110,231 B1 | * | 9/2006 | De La Ree et al. | 361/71 |

(Continued)

OTHER PUBLICATIONS

"Advanced DER Compliant Distribution Circuits for High Reliability—2006 Update", W. Steeley, 1012771, Technical Update 2006, Electric Power Research Institute, Palo Alto, CA, Dec. 2006.

(Continued)

*Primary Examiner* — Ramesh Patel
(74) *Attorney, Agent, or Firm* — Cantor Colburn LLP (57) ABSTRACT

A system and method for operating an autoloop system on an electrical distribution system is provided. The system includes a first branch circuit having a first recloser and a midpoint recloser and a second branch circuit having a second feeder recloser and a midpoint recloser. A tie recloser is electrically coupled between the first branch circuit and the second branch circuit wherein the tie recloser closes only after a fault is detected. A master controller associated with the first and second branch circuits communicates with the reclosers of the first and second branch circuits. The master controller includes a processor for blocking a fast tripping function of a feeder recloser in response to the detection of a fault on the other branch circuit. The portion of a circuit where a fault is detected may be isolated to minimize the portion of the first and second branch circuits without power.

21 Claims, 7 Drawing Sheets

U.S. PATENT DOCUMENTS

| | | | |
|---|---|---|---|
| 7,158,012 B2 * | 1/2007 | Wiesman et al. | 340/538.16 |
| 7,414,819 B2 * | 8/2008 | Lee et al. | 361/61 |
| 7,495,574 B2 * | 2/2009 | Rocamora et al. | 340/638 |
| 7,496,430 B2 * | 2/2009 | Mak | 700/292 |
| 7,945,400 B2 * | 5/2011 | Hou | 702/58 |
| 7,979,239 B2 * | 7/2011 | Trias | 702/182 |
| 2002/0015271 A1 * | 2/2002 | Meisinger et al. | 361/84 |
| 2002/0080539 A1 | 6/2002 | McClure et al. | |
| 2005/0280963 A1 * | 12/2005 | Brucker | 361/62 |
| 2009/0046400 A1 * | 2/2009 | McCarthy et al. | 361/42 |
| 2011/0004355 A1 * | 1/2011 | Wang et al. | 700/286 |
| 2011/0029148 A1 * | 2/2011 | Yang et al. | 700/297 |
| 2011/0175750 A1 * | 7/2011 | Anderson et al. | 340/870.16 |

OTHER PUBLICATIONS

"Secondary Network Distribution Systems Background and Issues Related to the Interconnection of Distributed Resources", M. Behnke, W. Erdman, S. Horgan, D. Dawson, W. Feero, F. Soudi, D. Smith, C. Whitaker and B. Kroposki, Technical Report, NREL/TP-560-38079, National Renewable Energy Laboratory, Golden, CO, Jul. 2005.

"Requirements Based Evaluation of BPL for Power System Sensing, Command and Control Applications", Erich W. Gunther, EPRI and Electricity Innovation Institute, IEEE Standardization of Broadband over Power Line Technologies, Jun. 7, 2004 meeting presentation, available via http://grouper.ieee.org/groups/bpl/, accessed Aug. 6, 2008.

"Auto-Loop Improvement", Leeman Hong, Winnie H. Yueh and David J. Allen, IEEE Transactions on Power Delivery, vol. 9, No. 2, pp. 828-832, Apr. 1994.

Written Opinion of the International Searching Authority mailed Mar. 5, 2010; references cited in PCT are listed herein.

* cited by examiner

AUTOLOOP SYSTEM AND METHOD OF OPERATION

BACKGROUND OF THE INVENTION

The present invention relates generally to automatic loop ("autoloop") system for an electrical power distribution network and more particularly to an autoloop system that eliminates momentary power interruptions on the non-faulted portion of the electrical loop and which prevents reclosers from closing in on known faults.

Electrical utilities have a number of metrics that are used to track performance and customer satisfaction. These metrics, which include the system average interruption frequency index ("SAIFI"), the customer average interruption duration index ("CAIDI"), and for some utilities, the momentary average interruption frequency index ("MAIFI"). SAIFI measures the average number of interruptions that a customer would experience during a time period, such as a year. CAIDI measures the duration of the interruption that a customer would experience, and is generally a few hours per year. MAIFI measures the number of power interruptions that have a duration of less than five minutes that a customer would experience during a given time period.

Some or all of these metrics are also used by government regulators to aid in determining if the electrical utility is adhering to the regulations in maintaining a durable and reliable electrical distribution network. As a result, electrical utility and distribution companies have developed system architectures that minimize the duration and frequency of power outages. One technique uses a device called an "autorecloser" or simply "recloser", in the protection scheme for the distribution system. A recloser is a type of circuit breaker that includes a mechanism that allows the circuit breaker to close or reconnect the electric circuit. The premise of the recloser is that many electrical faults on the overhead open wire system are transitory, due to issues such as a tree limb touching or falling on a power line for example. The recloser includes a controller that is programmed to make several attempts to reconnect before locking open the recloser. Generally, the feeder recloser is programmed with an operating profile that provides for one "fast" trip and two "slow" trips before finally locking open.

Another technique used to improve performance is to arrange the distribution network into two or more branch circuits that can be adaptively coupled in the event of a failure. Generally, a substation will provide two or more feeder branch circuits to a typical autoloop. A feeder recloser is positioned at the beginning of the circuit and provides the protection functionality discussed above. A second midpoint recloser is positioned at an intermediate position along the branch circuit. Positioned at the end of the branch circuit is a tie recloser that couples the branch circuit with a similarly configured adjacent branch circuit.

The tie recloser is normally in an open position to prevent the flow of electrical current between the branch circuits. In the event of a fault between the feeder and midpoint that the feeder recloser cannot clear, the feeder recloser locks open and results in a loss of potential on the branch circuit. When this occurs, the midpoint recloser changes settings to trip at a lower current level and lock open after only one trip. The tie recloser is arranged to automatically close at short period of time, typically 15 seconds, upon the detection of the loss of potential. When the tie recloser connects the two branch circuits, electrical current can flow into the branch circuit with the electrical fault. Depending on where the fault is located on the branch circuit, partial electrical service can be restored to the portion of the branch circuit that experienced the failure. For example, if the fault occurs between the feeder recloser and the midpoint recloser, when the tie recloser connects the circuits, electrical power flows into the branch circuit. Since the fault is still present, the midpoint recloser trips and locks open. However, electrical power is still available for the customers between the midpoint recloser and the tie recloser. Thus the average duration of electrical power loss and the amount of affected customers are minimized.

However, since the fault is still present when tie recloser connects the branch circuits, the feeder recloser that protects the second or unaffected branch circuit will also detect the fault. The detection of the fault may cause the feeder recloser on the non-faulted branch circuit to trip once on a fast trip. Thus, the customers on the unaffected branch circuit will experience one momentary interruption in electrical power during a short period of time after the tie recloser connects the branch circuits and before the midpoint recloser near the fault trips. The closing of the tie recloser into a fault also creates undesirable power quality issues in the branch circuits. When the tie reclosure attempts to close into the faulted circuit, the voltage on the faulted phase sags and the unaffected phases may experience a voltage rise.

Thus, while existing electrical distribution systems are suitable for its intended purpose, there remains a need for improvements; particularly regarding the minimization or elimination of momentary electrical power interruptions and the improvement of power quality on autoloop configured branch circuits when a tie recloser is closed.

SUMMARY OF THE INVENTION

An automatic loop system for an electrical distribution system is provided. The system includes a first branch circuit having a first feeder recloser and a first midpoint recloser is electrically coupled in series. A second branch circuit having a second feeder recloser and a second midpoint recloser is electrically coupled in series. A tie recloser is electrically coupled between the first branch circuit and the second branch circuit. A first controller is associated with the first branch circuit and the second branch circuit. The first controller is disposed in communication with the first feeder recloser, the second feeder recloser, the first midpoint recloser, the second midpoint recloser and the tie recloser. The first controller further includes a processor responsive to executable computer instructions for providing an alternate profile indicative of a delay period to the second feeder recloser in response to receiving a fault signal from the first branch circuit.

A method of operating an automatic loop system for an electrical distribution system is also provided. The method includes the step of monitoring an electrical characteristic of a first branch circuit. A change is detected in the electrical characteristic indicative of a fault condition. A first signal is transmitted to a first controller. Devices on said first branch circuit are polled for voltage and current measurements and switch positions at the devices. The voltage and current measurements are transmitted to first controller. An alternate profile signal is transmitted to a first feeder recloser on a second branch circuit. The first feeder recloser is switched to operate under said alternate profile. The performance of a one fast trip function of the first feeder recloser is delayed for a time period in response to the switching to the alternate profile.

An automatic loop system controller for an electrical distribution system having a first branch circuit and a second branch circuit coupled by a tie recloser is also provided. The controller includes a processor and a communications connection electrically coupled to the processor. The processor receives data and instructions as inputs and provides data and instructions as outputs. The data inputs describing a detected fault condition, a plurality of voltages measured at a corresponding plurality of branch circuit devices, a plurality of currents measured at said corresponding plurality of branch circuit devices, a feeder recloser position, a midpoint recloser position, and a tie recloser position. The output instructions include an alternate profile in delaying a tripping response of a feeder recloser for a defined period of time to allow the tie recloser device to close and electrically couple the first branch circuit and the second branch circuit.

BRIEF DESCRIPTION OF THE DRAWINGS

Referring now to the drawings, which are meant to be exemplary and not limiting, and wherein like elements are numbered alike.

DETAILED DESCRIPTION

Figure 1:
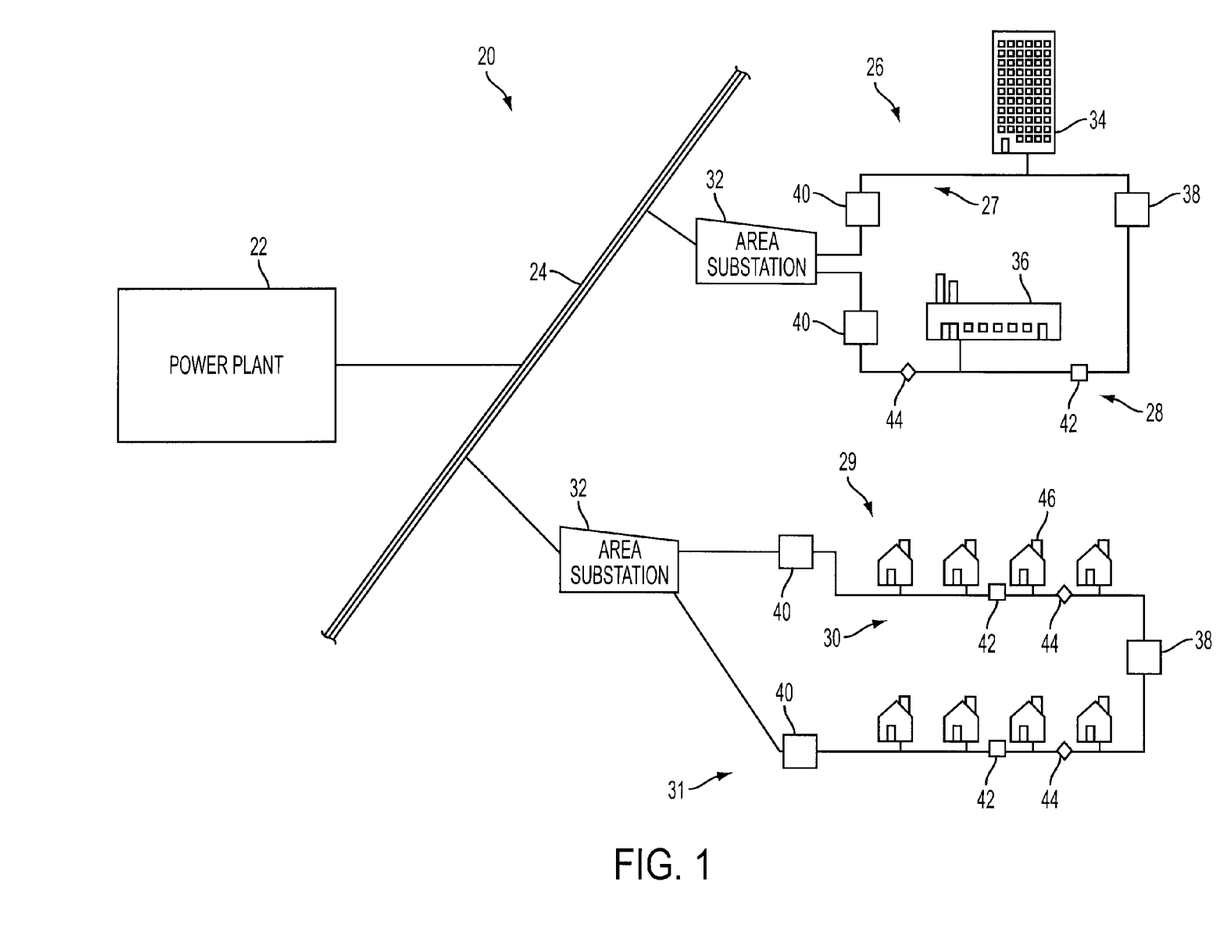
FIG. 1 is a schematic illustration of a utility electrical distribution system.

FIG. 1 illustrates an exemplary embodiment of a utility electrical distribution system 20. The utility system 20 includes one or more power plants 22 connected in parallel to a main transmission system 24. The power plants 22 may include, but are not limited to: coal, nuclear, natural gas, or incineration power plants. Additionally, the power plant 22 may include one or more hydroelectric, solar, or wind turbine power plants. It should be appreciated that additional components such as transformers, switchgear, fuses and the like (not shown) may be incorporated into the utility system 20 as needed to ensure the safe and efficient operation of the system. The utility system 20 is typically interconnected with one or more other utility networks to allow the transfer of electrical power into or out of the electrical system 20.

The main transmission system 24 typically consists of high transmission voltage power lines, anywhere from 69 KV to 500 KV for example, and associated transmission and distribution equipment which carry the electrical power from the point of production at the power plant 22 to the end users located on local electrical distribution systems 26, 29. The local distribution systems 26, 29 are connected to the main distribution system by area substations 32 which reduce transmission voltage to distribution levels such as 13 KV, 27 KV or 33 KV. Area Substations 32 typically contain one or more transformers, switching, protection, and control equipment. Area Substations 32 all include circuit breakers to interrupt faults such as short circuits or over-load currents that may occur. Substations 32 may also include equipment such as fuses, surge protection, controls, meters, capacitors, and load tap changers for voltage regulation.

The area substations 32 connect to one or more local electrical distribution systems, such as local distribution autoloop system 26, for example, that provides electrical power to a commercial area having end users such as an office building 34 or a manufacturing facility 36. As will be discussed in more detail below, the area substation 32 typically has two or more feeder circuits that provide electrical power to different feeder circuit branches 27, 28 of the local distribution network 26. A connection between the two portions 27, 28 of the local distribution network 26 is maintained through a device known as a tie recloser 38. During normal operations, the tie recloser 38 remains "open" preventing the flow of electrical power between the local feeder branches 27, 28. The tie recloser 38 operates in conjunction with other feeder recloser devices 40 to form a radial automatic "autoloop" distribution system that improves performance of the utility system and minimizes the impact of a fault in one portion of the local distribution system.

The residential distribution system 29 includes one or more residential buildings 46 and light industrial or commercial operations. Similar to the commercial distribution network 26, the residential system 29 is divided into multiple branch feeders 30, 31 that are fed by the substation 32. Typically, the local distribution system 29 is arranged such that approximately up to 6 MVA of power is provided on each branch circuit of a five recloser autoloop for electrical loads, such as residential buildings. Similar to the distribution autoloop 29, the branches 30, 31 are connected by a tie recloser 38 to form an autoloop. In addition to the tie recloser 38 and the feeder recloser 40, the local distribution network may include additional electrical control devices such as midpoint recloser 42 and remotely controlled sectionalizers 44. The electrical control devices 42, 44 allow the utility network to further isolate faults in the local distribution networks and minimize the number customer affected with the loss of power.

Figure 2:
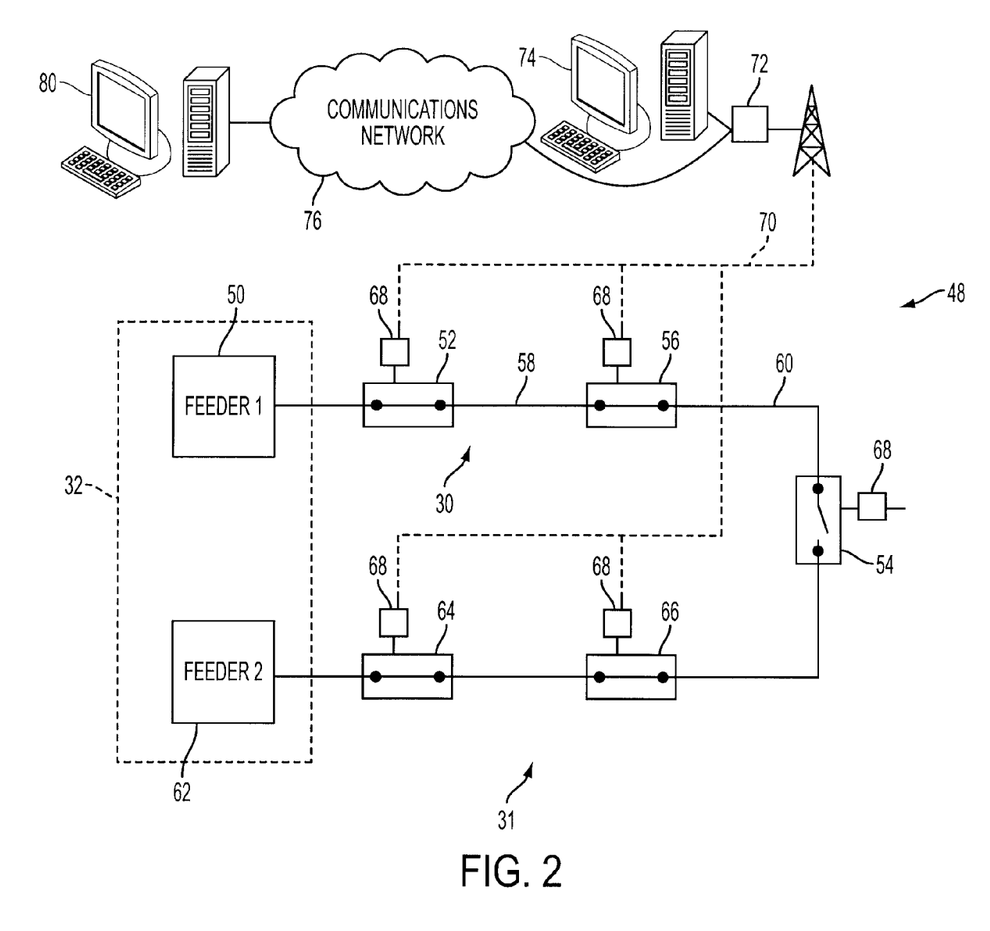
FIG. 2 is an schematic illustration of a portion of the electrical distribution system of FIG. 1 with two branch circuits configured as an autoloop.

Referring now to FIG. 2, an exemplary embodiment autoloop system 48 formed by the feeder branches 30, 31 is illustrated. In this embodiment, a first feeder 50 is located at the substation 32 to provide electrical power to the first branch circuit 30. A feeder recloser 52 is positioned to receive electrical power from the feeder 50 and transmit the electrical power to connected loads. As used herein, a recloser is a circuit breaker capable of interrupting electrical current to a protected circuit. The recloser further includes a mechanism that allows the recloser to automatically reclose after it has opened due to an electrical fault. The first branch circuit 30 terminates at a tie recloser 54. As discussed above, the tie recloser 54 remains open until the occurrence of an electrical fault in either the first branch circuit 30 or the second branch circuit 31. Between the feeder recloser 52 and the tie recloser 54 is a midpoint recloser 56. It should be appreciated that electrical loads are connected to the first branch circuit 30 but are not illustrated here for the purpose of clarity. The reclosers 52, 54, 56 break the branch circuit 30 into segments 58, 60 that may be isolated in the event of an electrical fault.

Similar to the first branch circuit 30, the second branch circuit 31 includes a feeder 62 located at the substation 32. The feeder 62 provides electrical power to a feeder recloser 64. The second branch circuit 31 ends at the tie recloser 54 with a midpoint recloser 66 positioned in between.

Each of the reclosers includes a controller 68 that provides command and control functionality for the recloser. The controller 68 further includes a communications device for transmitting and receiving data and instructions along a communications connection 70 from a master controller 72. It should be appreciated that the communications connection 70 may be any suitable communications means, including wired or wireless, capable of quickly and reliably transmitting information. In the exemplary embodiment, the communications connection 70 is a radio connection in the 900 MHz spectrums. The communications connection 70 may also be a leased telecommunications line (e.g. X.25, T1), a fiber network, a PSTN POTS network, a DSL telecommunications line, a cable telecommunications line, a microwave connection, a cellular connection, or a wireless connection using the IEEE 802.1 standard.

The controller 68 and master controller 72 may be any suitable control device capable of receiving multiple inputs and providing control functionality to multiple devices based on the inputs. Controller 68 and master controller 72 include a processor that is a suitable electronic device capable of accepting data and instructions, executing the instructions to process the data, and presenting the results. Processor may accept instructions through a user interface, or through other means such as but not limited to electronic data card, voice activation means, manually-operable selection and control means, radiated wavelength and electronic or electrical transfer. Therefore, the processor can be a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a superconducting computer, a supercomputer, a solid-state computer, a single-board computer, a buffered computer, a computer network, a desktop computer, a laptop computer, or a hybrid of any of the foregoing.

The controller 68 and master controller 72 may include storage devices such as read only memory (ROM), nonvolatile memory (NVM), and random access memory (RAM). The storage devices may comprise a magnetic, solid state, optical, or other storage media for storing applications, data, operating systems and other information. Controller 68 and master controller 72 further include operation control methods embodied in application code, such as the method shown in FIG. 4 for example. These methods are embodied in computer instructions written to be executed by processor, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), PHP (hypertext preprocessor) and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

In the exemplary embodiment, the master controller is configured as a basic supervisory control and data acquisition (SCADA) system. As will be discussed below, the SCADA system allows control room operators to remotely operate the reclosers and monitor switch positions, voltages and currents. To accomplish this, the master controller 72 may be further coupled to communicate with a local computer 74 and a communications network 76. The master controller 72 may further be disposed to communicate with a remote computer 80. The communications between the remote computer 80 and the master controller 72 is through a secure network 76. The master controller further includes operational methods for receiving data and instructions from the local computer 72 and the remote computer 80. It should be appreciated that the master controller 72 may further be disposed in communication with other master controllers (not shown) from other autoloop systems, such as the autoloop for distribution network 26 for example.

Figure 3:
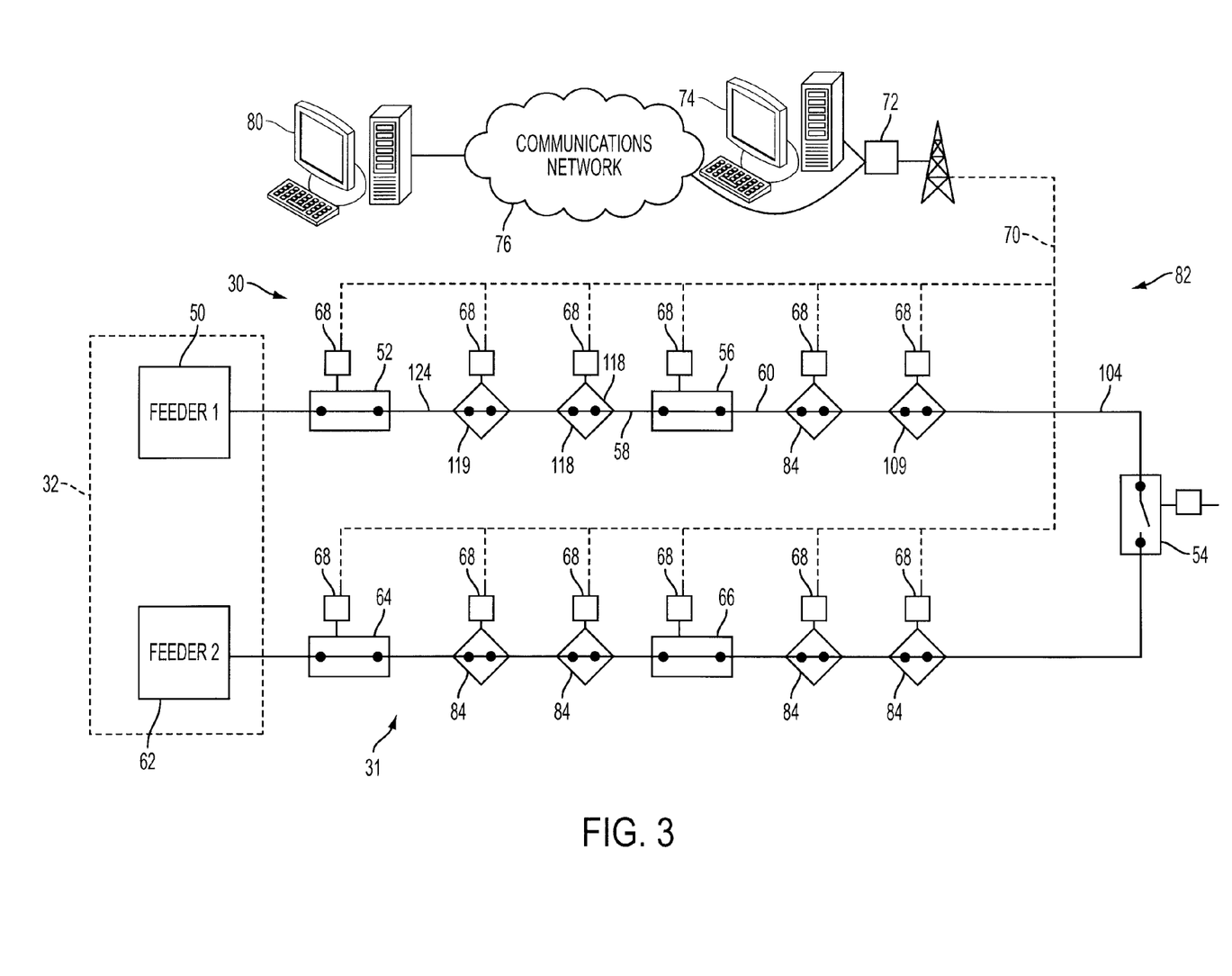
FIG. 3 is a schematic illustration of an alternate embodiment of the autoloop system of FIG. 2.

Another embodiment autoloop system 82 is illustrated in FIG. 3. In this embodiment, additional electrical switch devices 84, 109, 118, 119, such as SCADA switches for example, are coupled in between each of the reclosers. The switches 84, 109, 118, 119 are also referred to as a cutout or a sectionalizer switch. The switches 84, 109, 118, 119 further divide or sectionalize each branch circuit 30, 31. In the exemplary embodiment, the switches 84, 109, 118, 119 do not include protective current interruption functionality, such as a circuit breaker, but operate as a remotely operated switch. The switches 84, 109, 118, 119 also include a controller 68 that is disposed in communication with the master controller 72. It should be appreciated that the use of two switches 84, 109, 118, 119 between each of the reclosers is meant to be exemplary and not limiting. By expanding the number of switches 84, 109, 118, 119, the number of affected customers may be further minimized.

It should be appreciated that the controller 68 for each of the reclosers may utilize different control methods to perform the desired operations. Further, in the exemplary embodiment, each of the controllers 68 includes executable instructions for operating in a desired default mode, or default operational profile, in the event that the communications connection 70 is interrupted. The controllers 68 may also switch to the default profile in other circumstances. In one embodiment, if one of the switches 84, 109, 118, 119 or the reclosers 52, 56, 64, 66 is not operating in a normal state, such as when maintenance or service operations are being performed for example, the other switches and reclosers will operate under their default profile. Also, a control center operator who monitors the operation of the autoloop may issue a command to the controllers 68 to operate under the default profile.

In this default profile, the feeder reclosers 52, 64 have an operational profile arranged to lock open after one "fast" and two "slow" trips. The "fast" and "slow" levels will depend on the desired response by the utility and generally refer to the amount of time the recloser takes to automatically close. As used herein, the term "profile" means a set of operating parameters, set points and operational methods, which define the response of the recloser. A profile may include parameters and set points such as but not limited to: current levels for tripping the recloser, the number and types of trips before locking open, and the time periods for tripping at different current levels for example. Once the feeder recloser locks open, all electrical current to the branch circuit is interrupted. In the default mode of operation, the midpoint reclosers 56, 66 will generally change to a "half-mode" profile once a loss of potential is detected due to the opening of the upstream feeder recloser. In the "half-mode" operation, the midpoint recloser changes the tripping settings in the profile to trip at one-half the normal current level and to lock open after one trip event.

Under the default settings, the tie recloser 54 closes a defined time period, 15 second for example, after detecting a loss of potential on either side. Once the tie recloser 54 closes, electrical current flows from one branch circuit into the other allowing a partial restoration electrical power. For example, if a fault occurs in segment 58, under the default operational profile, the feeder recloser 52 opens interrupting the current. Upon the loss of potential, the midpoint feeder 56 switches to a half-mode profile and the tie recloser 54 initiates a timer. After 15-20 seconds, the tie recloser 54 closes allowing electrical current from the second branch circuit 31 to flow into segment 60. The midpoint recloser 56 will trip due to the fault in segment 58, however, electrical power branch circuit 31 remains for consumers on segment 60. Thus only half the loads on branch circuit 30 are affected by the fault.

While the default mode profile provides improvements in reducing the number of electrical loads and customers affected by the fault, when the tie recloser connects the branch circuits, there will be a momentary power interruption on the branch circuit that does not have the fault, such as the second branch circuit 31 using the example above. This momentary interruption is due to the fault on the other branch circuit. The feeder recloser momentarily opens when it detects the fault. The midpoint recloser will trip when the feeder recloser closes.

Figure 4:
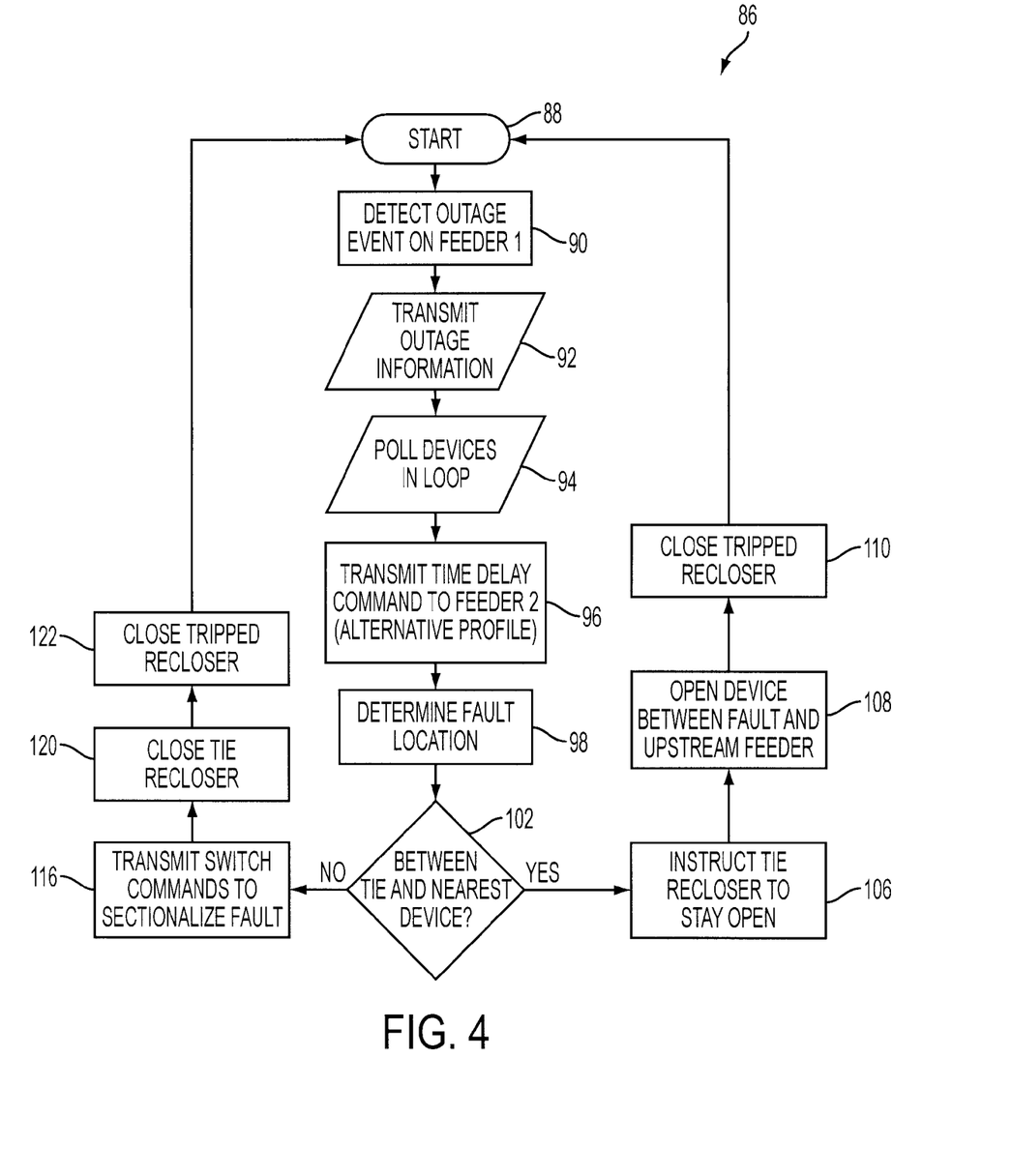
FIG. 4 is a flow chart illustration of an exemplary method of operating the autoloop system.

The operation control method 86 in FIG. 4 for the autoloop system 64 under normal conditions, meaning when the controllers 68 are able to transmit and receive instructions and data over communications connection 70, is illustrated in FIG. 4. The process 86 starts in block 88 and detects a fault in block 90. The fault detection may occur in any one of the feeder or midpoint reclosers 52, 56, 64, 66. Generally, the recloser immediately upstream from the location of the fault will detect the fault. As discussed above, by default the reclosers will not lock open on the initial detection of a fault but will close again. For permanent faults, the feeder recloser will eventually open and lockout after its programmed open/close operations. Once the initial fault (e.g. "fast" trip) is detected, the controller 68 of the recloser that detected the fault transmits a signal to the master controller 72 in block 92. The master controller 72 receives the information and immediately polls the other devices in block 94. The polling by the master controller 72 includes both switches 84, 109, 118, 119 and reclosers 52, 56, 64, 66. The information requested by master controller 72 includes but is not limited to voltages, currents, switch positions and recloser settings for example.

The master controller 72 then transmits in block 96 a command to the feeder recloser for the unaffected or unfaulted branch circuit to operate under an alternate operational profile to prevent fast trip operation for 20 seconds. After that time, the feeder recloser will return to its normal default profile. For example, if feeder recloser 52 detected the fault, the alternate profile command is issued to feeder recloser 64. This command prevents the feeder recloser initiating a fast trip on the unaffected branch circuit avoiding momentarily interruption of the electrical current when the tie recloser 54 closes. After receiving the polling information, the master controller will seek to determine from the voltage and current levels measured at the switches 84, 109, 118, 119 and reclosers 52, 56, 64, 66 where the fault is located in block 98. Based on this information, the master controller 72 should be able to determine the segment, such as segment 58 for example, where the fault is located.

Once the location of the fault is determined, the master controller 72 attempts to minimize the number of electrical loads or customers on the affected branch circuit lose electrical power. The commands issued by the master controller 72 will depend on where on the branch circuit the fault is located. In query block 102, the process 86 determines whether the fault occurred between the tie recloser 54 and the nearest switch 84, at segment 104 for example. If the query block 102 returns an affirmative, meaning there is a fault in segment 104 for example, then the process 86 proceeds to block 106 where the master controller 72 issues instructions to the tie recloser 54 not to close. Process 86 then proceeds in block 108 where the master controller 72 issues an instruction to open the switch adjacent the tie recloser 54 and the detected fault, such as switch 109 for example.

The opening of the switch 109 isolates the faulted segment 104 and by avoiding the closure of tie recloser 54, the unaffected branch circuit, branch circuit 31 for example, does not experience any momentary interruptions. Further, once the switch 109 is opened, any tripped reclosers on the affected branch circuit are issued a command to close in block 110 allowing electrical power to resume all parts of the distribution network except for the isolated segment 104.

If the query block 102 returns a negative response, such when an electrical fault is located in segment 58, the process 86 proceeds to block 116 where master controller 72 transmits commands to open the circuit on either side of the segment in which the fault is located. In the example where the fault is located along segment 58, the master controller issues the open command to midpoint recloser 56 and switch 118. It should be appreciated that if the segment with the fault is between two switches, such as between switches 118, 119 for example, the open commands would be transmitted to the respective switches to open the branch circuit.

Once the segment with the fault is isolated from the branch circuit, the tie recloser 54 is allowed to close in block 120. Since the segment with the fault, such as segment 58 for example, has been isolated, the feeder recloser on the unaffected branch, such as feeder recloser 64 for example, will not detect a fault and will not trip. Thus the unaffected branch circuit does not experience any momentary interruptions in current flow. Either simultaneous with or after the tie recloser 54 closes, the master controller 72 issues a close command to the locked open recloser allowing the restoration of electrical power to the segments of the affected branch circuit up to the segment where the fault is located. It should be appreciated that if the location of the fault is in the segment immediately downstream of a recloser, such as segment 124 or segment 60 that are adjacent the feeder recloser 52 and midpoint recloser 56 for example, then the master controller 72 will not issue the command to close. Thus keeping the faulted segment isolated.

Figure 5:
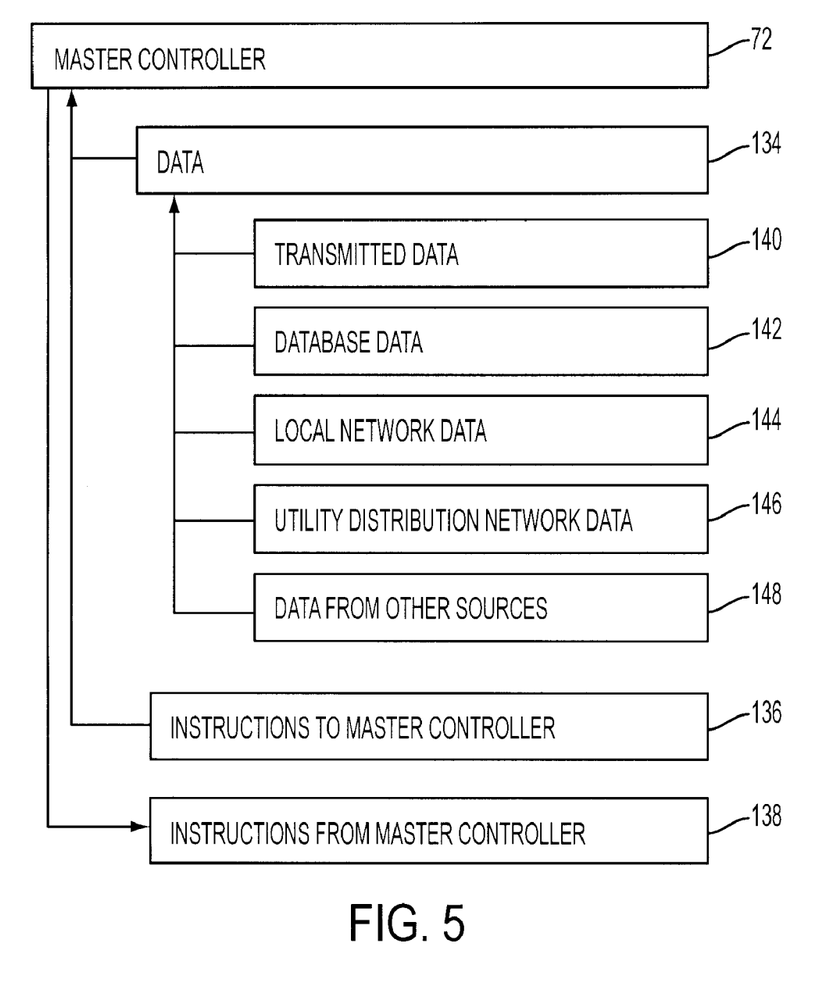
FIG. 5 is a representation of a controller which is disposed in communication with one or more autoloop systems and a utility distribution network, the data sources in FIG. 5 are described in terms of the kind of information including, but not limited to data, instructions to a master controller and instructions from a master controller.

Referring now to FIG. 5, there is shown an alternate embodiment of master controller 72 receiving as inputs data 134, and instructions 136. Master controller 72 also outputs instructions 138. The data 134 may come from a variety of sources, such as transmitted data 140, database data 142, local distribution system data 144, main distribution system data 146, and other data 148. The data and instruction outputs from master controller 72 may be transmitted to the feeder reclosers 52, 64, the midpoint reclosers 56, 66, the tie recloser 54, the switches 84, 109, 118, 119, a master controller on another local distribution network, a controller associated with the main distribution system 24, a locally connected computer 74 or a remotely connected computer 80.

Figure 6:
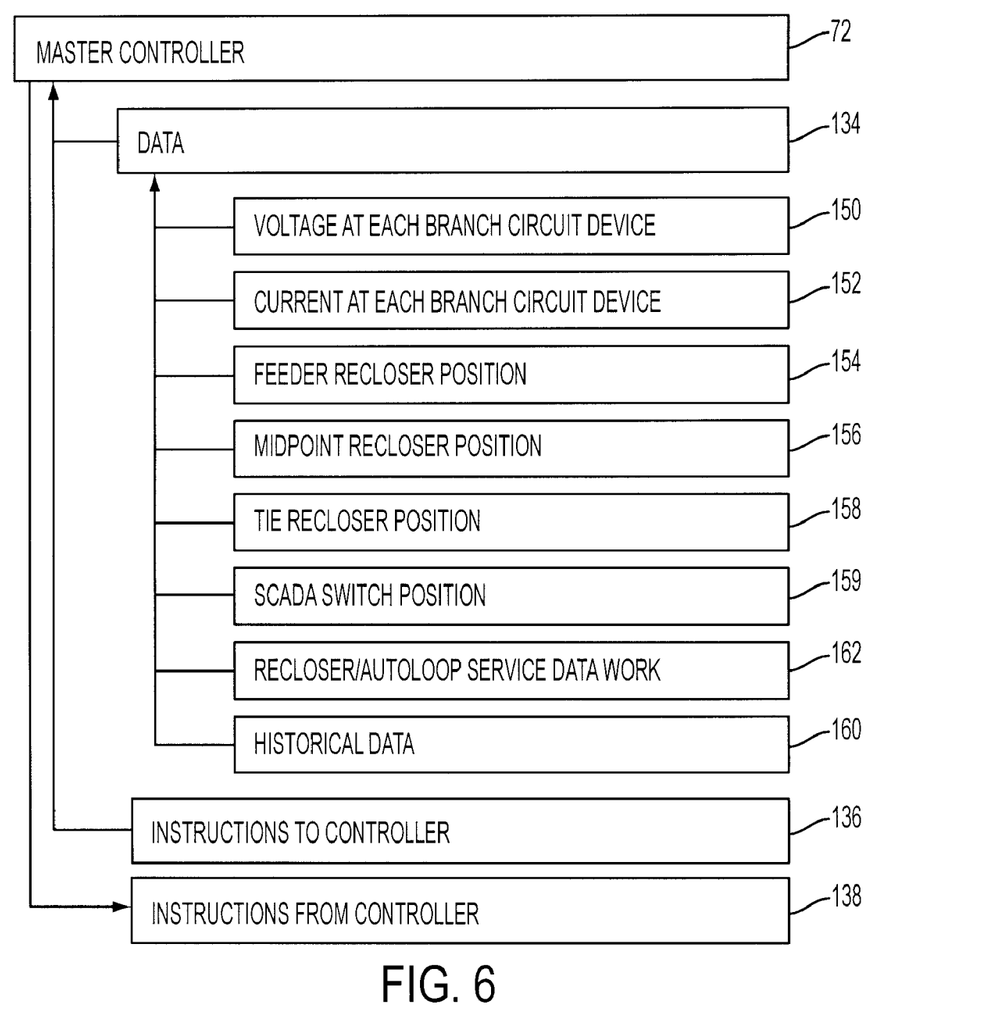
FIG. 6 is a representation of a controller which is disposed in communication with one or more autoloop systems, a utility distribution network, and data sources, the controller of FIG. 6 is arranged to receive data, including but not limited to voltages at each branch circuit device, current at each branch circuit device, feeder recloser position, midpoint recloser position, tie recloser position, and scheduled autoloop service/restoration work data; and, FIG. 7 is a representation of a controller which is disposed in communication with one or more autoloop systems, a utility distribution network, and data sources, the controller of FIG. 8 is arranged to transmit instructions, including but not limited to instructions on whether a fault signal has been received, polling of branch circuit devices, delay trip commands, comparing and evaluating operational data, determination of fault locations, open switch commands, and commands to restore power to a branch circuit.

Another embodiment of the master controller 72 is shown in FIG. 6. The data 134 is described in terms of the type of information represented by the data, such as data received during the polling process 94 from devices on the local distribution system after a fault has been detected. The data 134 includes voltage measurement data for each device 150, current measurement data for each device 152, feeder recloser position data 154, midpoint recloser position data 156, tie recloser position data 158 and SCADA switch position data 159. The data 134 may further include data such as historical measurement data 160 and scheduled recloser/autoloop service work 162. The historical data 160 may be used by the master controller 72 to make predictive corrective actions, such as by using heuristic analysis for example. Similar to the embodiment shown in FIG. 5, the data and instruction outputs from master controller 72 may be transmitted to the feeder reclosers 52, 64, the midpoint reclosers 56, 66, the tie recloser 54, the switches 84, 109, 118, 119, a master controller on another local distribution system, a controller associated with the main distribution network 24, a locally connected computer 74 or a remotely connected computer 80.

Figure 7:
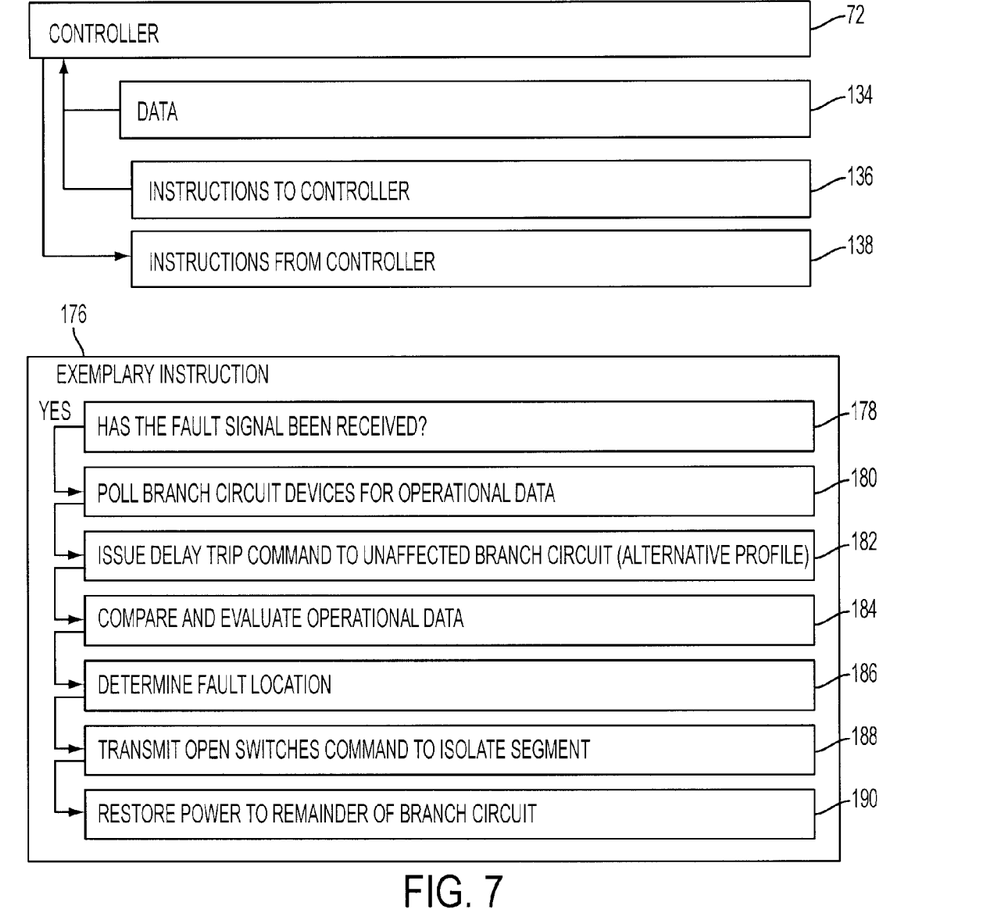

The master controller 72 may also include other instructions such as automated instructions that are executed on a processor associated with master controller 72 and responsive to executable computer instructions as illustrated in FIG. 7. Another exemplary embodiment instruction 176 that includes a method for automatically isolating a segment and restoring electrical power to the remainder of the branch circuit. First the master controller 72 queries to determine 178 if a fault signal has been received. It should be appreciated that the fault signal may be an interrupt to processor associated with the master controller 72 that automatically takes priority over other processes being executed by the processor.

Next the master controller polls 180 each of the devices on the branch circuit where the fault signal was received. An alternate profile command 182 is issued to the feeder recloser on the unaffected branch circuit that delays the trip response of the feeder recloser for a defined period of time. In the exemplary embodiment, the alternate profile instruction is issued within 10 seconds (and preferably less) after receiving the feeder lockout signal and the trip delay instruction delays the response of the feeder recloser for at least 15 seconds, and preferably 20 seconds from the time the feeder lockout signal is received. Once the delay period expires, the feeder recloser automatically returns to its default operational instructions.

Once the alternate profile command 182 has been issued, the master controller evaluates and compares 184 the operational data, such a voltage and current measurements for example. From the evaluation of the data, the location and segment of the branch circuit in which the fault occurred is determined 186. Open commands are then issued 188 to the switches 84, 109, 118, 119 or reclosers associated with the identified segment.

In the exemplary embodiment, the master controller 72 also validates signals received from the switches and reclosers on the branch circuits. These validations may include a checksum validation or a time validation for example. In one embodiment, the signals need to be received by the master controller 72 within a time window, such as 20-30 seconds for example. This validation may be desired, for example, in embodiments where the communications connection 70 is a radio communication that may, under some circumstances, have latency in communicating the signals. Since the data transmitted by the switches and reclosers may change rapidly, the signal needs to be received within the time window to be considered a valid. In the event a signal from one of the switches or reclosers is outside the window, the master controller 72 resets process and waits for another event or fault to trigger a restart of the process. It should be appreciated that when the process resets, the switches and reclosers continue to operate under their default operational profiles.

It should be appreciated that the autoloop system and method of operation disclosed herein provides a number of advantages in minimizing the impact of an electrical fault in a distribution autoloop. The autoloop system and method may minimize the number of electrical loads and customers affected by an electrical fault in the distribution system by quickly and automatically isolating the affected segment and restoring electrical power to the other portions of the electrical circuit. The autoloop system and method may also provide advantages in eliminating the momentary interruption of electrical power on the unaffected branch circuit in the autoloop by use of an alternate profile for the feeder recloser and isolating the segment with the fault. Finally, since the system and method of operation do not allow the tie reclose to close into a fault, voltage sag and voltage rise may be avoided thus keeping the power quality on both branch circuits at a higher level.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An automatic loop system for an electrical distribution system comprising:
   a first branch circuit powered by a first feeder, said first branch circuit having a first feeder recloser and a first midpoint recloser electrically coupled in series, said first branch circuit having a first segment opposite said first feeder;
   a second branch circuit powered by a second feeder, the second branch circuit having a second feeder recloser and a second midpoint recloser electrically coupled in series, said second branch circuit having a second segment disposed opposite said second feeder;
   a tie recloser electrically coupled between said first segment and said second segment wherein the tie recloser closes in response to the detection of a fault when the fault is not in the said segment or said second segment; and,
   a first controller associated with said first branch circuit and said second branch circuit, said first controller being disposed in communication with said first feeder recloser, said second feeder recloser, said first midpoint recloser, said second midpoint recloser and said tie recloser, said first controller including a processor responsive to executable computer instructions for providing an alternate profile indicative of a delay period to said second feeder recloser in response to receiving a fault signal from said first branch circuit.

2. The system of claim 1 wherein said first controller is further responsive to executable computer instructions for closing said tie recloser before said delay period expires.

3. The system of claim 2 wherein said first feeder recloser, said second feeder recloser, said first midpoint recloser, said second midpoint recloser and said tie recloser each include a second controller disposed in communication with said first controller.

4. The system of claim 3 wherein said first controller is further responsive to executable instructions for determining a location of an electrical fault in said first branch circuit.

5. The system of claim 4 further comprising a first switch electrically coupled between said first midpoint recloser and said tie recloser, and wherein said first controller is further responsive to executable computer instructions to transmit a first signal to said tie recloser if said fault is between said first switch and said tie recloser, and wherein said tie recloser second controller includes a processor that is responsive to executable computer instructions to keep said tie recloser open in response to receiving said first signal.

6. The system of claim 3 further comprising a second switch electrically coupled between said first feeder recloser and said midpoint recloser and wherein said first controller is responsive to executable computer instructions to transmit a second signal to said second switch if said fault is located in a segment of said first branch directly adjacent said second switch.

7. The system of claim 6 wherein said first controller is responsive to executable computer instructions to transmit a third signal to said first feeder recloser to transfer electrical power to said first branch circuit if said fault is downstream from said second switch.

8. The system of claim 7 wherein said first controller is responsive to executable computer instructions to transmit a fourth signal to said tie recloser to disconnect said first branch circuit and said second branch circuit in response to receiving a command from a remote computer.

9. A method of operating an automatic loop system for an electrical distribution system, said method comprising:
monitoring an electrical characteristic of a first branch circuit;
detecting a change in said electrical characteristic indicative of a fault condition;
transmitting a first signal to a first controller;
polling devices on said first branch circuit for voltage and current measurements and switch positions at said devices;
transmitting said voltage and current measurements to said first controller;
transmitting an alternate profile signal to a first feeder recloser on a second branch circuit; and,
switching said first feeder recloser to operate under said alternate profile;
delaying for a time period the performance of a one fast trip function of said first feeder recloser in response to said switching to said alternate profile.

10. The method of claim 9 wherein said time period is 15 seconds.

11. The method of claim 9 further comprising the step of closing a tie recloser to electrically couple said first branch circuit and said second branch circuit before said delay period expires.

12. The method of claim 11 further comprising the step of tripping and locking out a second feeder recloser.

13. The method of claim 12 further comprising the step of determining the location of said fault on said first branch circuit.

14. The method of claim 13 further comprising the step of opening a first switch and a second switch positioned on either side of said fault, wherein said first switch and said second switch are electrically coupled in series in said first branch circuit.

15. The method of claim 13 further comprising the step of opening a recloser device and third switch positioned on either side of said fault, wherein said recloser device and said third switch are electrically coupled in series in said first branch circuit.

16. The method of claim 13 further comprising the step of transmitting a second signal to said tie recloser when said fault is positioned in a segment of said first branch circuit adjacent said tie recloser.

17. The method of claim 16 wherein said tie recloser remains open in response to said second signal.

18. An automatic loop system controller for an electrical distribution system having a first branch circuit and a second branch circuit coupled by a tie recloser, said controller comprises:
a processor; and,
a communications connection electrically coupled to said processor;
wherein said processor receives data and instructions as inputs and provides data and instructions as outputs;
said data inputs describing a detected fault condition, a plurality of voltages measured at a corresponding plurality of branch circuit devices, a plurality of currents measured at said corresponding plurality of branch circuit devices, a feeder recloser position, a midpoint recloser position, and a tie recloser position; and
said output instructions include an alternate profile in delaying a tripping response of a feeder recloser for a defined period of time to allow said tie recloser device to close and electrically couple said first branch circuit and said second branch circuit.

19. The automatic loop controller of claim 18 wherein said instruction inputs enable said processor to determine the location of said fault on said first branch circuit.

20. The automatic loop controller of claim 19 wherein said output instructions prevent closure of said tie recloser when said location of said fault is located on a segment of said first branch circuit adjacent said tie recloser.

21. The automatic loop controller of claim 20 wherein said output instructions enable the opening of switches to segment a portion of said first branch circuit on which said fault is located.

* * * * *